(12) United States Patent
Zhou et al.

(10) Patent No.: US 12,710,861 B2
(45) Date of Patent: Aug. 18, 2026

(54) METHOD AND APPARATUS FOR GENERATING IMAGE PROCESSING INTERFACE, DEVICE, AND STORAGE MEDIUM

(71) Applicant: Beijing Bytedance Network Technology Co., Ltd., Beijing (CN)

(72) Inventors: Qiang Zhou, Beijing (CN); Gang Liu, Beijing (CN); Xiping Zhang, Beijing (CN); Ye Fu, Beijing (CN); Zhanpeng Li, Beijing (CN); Qin Xiao, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 400 days.

(21) Appl. No.: 18/259,638

(22) PCT Filed: Dec. 1, 2021

(86) PCT No.: PCT/CN2021/134889
§ 371 (c)(1),
(2) Date: Jun. 28, 2023

(87) PCT Pub. No.: WO2022/142985
PCT Pub. Date: Jul. 7, 2022

(65) Prior Publication Data

US 2024/0061565 A1 Feb. 22, 2024

(30) Foreign Application Priority Data

Dec. 30, 2020 (CN) ......................... 202011613301.3

(51) Int. Cl.

| | |
|---|---|
| ***G06F 16/955*** | (2019.01) |
| ***G06F 3/04845*** | (2022.01) |
| ***G06F 21/62*** | (2013.01) |

(52) U.S. Cl.
CPC ...... *G06F 3/04845* (2013.01); *G06F 16/9566* (2019.01); *G06F 21/6209* (2013.01); *G06F 2221/2141* (2013.01)

(58) Field of Classification Search
CPC ............. G06F 3/04845; G06F 16/9566; G06F 2221/2141; G06F 21/6209; G06F 8/30; G06F 16/5846; Y02D 10/00
See application file for complete search history.

(56) References Cited

U.S. PATENT DOCUMENTS

2008/0215967 A1 9/2008 Abrams et al.
2012/0177304 A1* 7/2012 Taber .................... G06F 16/587 382/284

(Continued)

FOREIGN PATENT DOCUMENTS

CN 102546664 A 7/2012
CN 102693232 A 9/2012

(Continued)

OTHER PUBLICATIONS

European Patent Office, Notice of Allowance for European Application No. 21913726.2, mailed Oct. 23, 2024, 43 pages.

(Continued)

*Primary Examiner* — Phi Hoang
(74) *Attorney, Agent, or Firm* — Alleman Hall LLP

(57) ABSTRACT

A method and an apparatus for generating an image processing interface, a device, and a storage medium, including: receiving a first instruction, where the first instruction is used to characterize an image parameter of a target image; determining an image template corresponding to the first instruction, where the image template is used to characterize a processing flow of the target image; and generating a processing interface of the target image according to the image template. Since the image template standardizes the process and steps of image processing, the specific operation (Continued)

steps for generating an image processing interface are simplified, while standardizing the generated image processing interface, reducing the using and maintenance cost of the image processing interface, and improving the security of the image processing interface.

20 Claims, 4 Drawing Sheets

(56) References Cited

U.S. PATENT DOCUMENTS

| | | | | |
|---|---|---|---|---|
| 2013/0097670 | A1* | 4/2013 | Walton | G06F 16/9577 709/213 |
| 2014/0047413 | A1* | 2/2014 | Sheive | G06F 8/33 717/110 |
| 2016/0065567 | A1 | 3/2016 | Aggarwal et al. | |
| 2017/0188213 | A1* | 6/2017 | Nirantar | H04L 67/564 |
| 2019/0057161 | A1 | 2/2019 | Ackerman et al. | |
| 2019/0158631 | A1* | 5/2019 | Aoki | G06F 16/9566 |
| 2019/0272194 | A1* | 9/2019 | Wills | H04L 67/561 |
| 2020/0053091 | A1* | 2/2020 | Childress | H04L 63/102 |
| 2020/0244645 | A1* | 7/2020 | Lingampally | G06F 21/41 |
| 2021/0026751 | A1* | 1/2021 | Larkin | G06F 11/324 |
| 2021/0027510 | A1* | 1/2021 | Avoyan | G06Q 10/40 |
| 2022/0070244 | A1* | 3/2022 | Eftekhari | H04L 9/0643 |

FOREIGN PATENT DOCUMENTS

| | | | |
|---|---|---|---|
| CN | 102984155 | A | 3/2013 |
| CN | 105659240 | A | 6/2016 |
| CN | 105721224 | A | 6/2016 |
| CN | 105843881 | A | 8/2016 |
| CN | 106254217 | A | 12/2016 |
| CN | 106302548 | A | 1/2017 |
| CN | 106530183 | A | 3/2017 |
| CN | 108153761 | A | 6/2018 |
| CN | 108319868 | A | 7/2018 |
| CN | 108737476 | A | 11/2018 |
| CN | 109408478 | A | 3/2019 |
| CN | 109740073 | A | 5/2019 |
| CN | 111209727 | A | 5/2020 |
| CN | 111784326 | A | 10/2020 |
| CN | 112132599 | A | 12/2020 |
| CN | 112149030 | A | 12/2020 |
| CN | 112685022 | A | 4/2021 |
| JP | 2007311840 | A | 11/2007 |

OTHER PUBLICATIONS

European Patent Office, Extended European Search Report Issued in Application No. 21913726.2, Mar. 27, 2024, Germany, 9 pages.

China National Intellectual Property Administration, International Search Report and Written Opinion Issued in Application No. PCT/CN2021/134889, Feb. 25, 2022, WIPO, 15 pages.

China National Intellectual Property Administration, Office Action and Search Report Issued in Application No. 202011613301.3, May 16, 2022, 11 pages. Submitted with partial English translation.

China National Intellectual Property Administration, Office Action and Search Report Issued in Application No. 202011613301.3, Aug. 10, 2022, 17 pages.

China National Intellectual Property Administration, Notice of Grant Issued in Application No. 202011613301.3, Nov. 7, 2022, 7 pages.

Benting, G., "On the implementation of transforming the 2+1 active/standby mode of the Softswitch end office to MSCPOOL," Gansu Science and Technology, vol. 30, No. 19, Oct. 2014, 5 pages. Submitted with English abstract.

* cited by examiner

METHOD AND APPARATUS FOR GENERATING IMAGE PROCESSING INTERFACE, DEVICE, AND STORAGE MEDIUM

CROSS-REFERENCE TO RELATED APPLICATION

This application a National Stage of International Application No. PCT/CN2021/134889, filed on Dec. 1, 2021, which claims priority to Chinese Patent Application No. 202011613301.3, filed with the China National Intellectual Property Administration on Dec. 30, 2020 and entitled "Method and Apparatus for Generating Image Processing Interface, Device, and Storage Medium". The disclosures of the aforementioned applications are hereby incorporated by reference in their entireties.

TECHNICAL FIELD

Embodiments of the present disclosure relate to a field of computer and network communication technology, and in particular, to a method and an apparatus for generating an image processing interface, a device, and a storage medium.

BACKGROUND

Image resources in the network are generally saved in cloud servers, and users can access a uniform resource locator (URL) to obtain an image. In order to adapt to a requirement for displaying and accessing the image resources, a developer using the image resources will carry out processing on the image to a certain extent, such as adjusting a size and a format of the image.

These details for processing the image are usually displayed as a preset character marker in a query (Query) parameter of an image URL. The developer using this image resource set the Query parameter to generate a URL that can meet a specific image processing requirement.

However, for this method for generating the URL, due to the variety of parameters and a complex processing flow, the efficiency of the image URL generation is low and the maintenance cost is high.

SUMMARY

Embodiments of the present disclosure provide a method and an apparatus for generating an image processing interface, a device, and a storage medium to overcome the problems that the efficiency of the image URL generation is low and the maintenance cost is high.

In a first aspect, an embodiment of the present disclosure provides a method for generating an image processing interface, including:

receiving a first instruction, where the first instruction is used to characterize an image parameter of a target image; determining an image template corresponding to the first instruction, where the image template is used to characterize a processing flow of the target image; and generating a processing interface of the target image according to the image template.

In a second aspect, an embodiment of the present disclosure provides an apparatus for generating an image processing interface, including:

a transceiving unit, configured to receive a first instruction, where the first instruction is used to characterize an image parameter of a target image;

a determining unit, configured to determine an image template corresponding to the first instruction, where the image template is used to characterize a processing flow of the target image; and a generating unit, configured to generate a processing interface of the target image according to the image template.

In a third aspect, an embodiment of the present disclosure provides an electronic device, including: at least one processor and a memory;

the memory has a computer-executable instruction stored therein;

the at least one processor executes the computer-executable instruction stored in the memory to enable the at least one processor to perform the method for generating an image processing interface described in the first aspect above and various possible designs of the first aspect.

In a fourth aspect, an embodiment of the present disclosure provides a computer readable storage medium storing a computer-executable instruction, when the computer-executable instruction is executed by a processor, the method for generating an image processing interface described in the first aspect above and various possible designs of the first aspect is implemented.

In a fifth aspect, an embodiment of the present disclosure provides a computer program product including a computer program, when the computer program is executed by a processor, the method for generating an image processing interface described in the first aspect above and various possible designs of the first aspect is implemented.

In a sixth aspect, an embodiment of the present disclosure provides a computer program, when the computer program is executed by a processor, the method for generating an image processing interface described in the first aspect above and various possible designs of the first aspect is implemented.

The embodiments provide a method and an apparatus for generating an image processing interface, a device, and a storage medium, including: receiving a first instruction, where the first instruction is used to characterize an image parameter of a target image; determining an image template corresponding to the first instruction, where the image template is used to characterize a processing flow of the target image; and generating a processing interface of the target image according to the image template. Since the image template standardizes the process and steps of image processing, the specific operation steps for generating a uniform resource locator are simplified, while standardizing the generated image processing interface, reducing the using and maintenance cost of the image processing interface, and improving the security of the image processing interface.

BRIEF DESCRIPTION OF DRAWINGS

In order to illustrate the embodiments of the present disclosure or the technical solutions in the related art more clearly, the following briefly introduces the accompanying drawings that need to be used in the description of the embodiments or the related art. Obviously, the accompanying drawings in the following description are some embodiments of the present disclosure, and for those of ordinary skill in the art, other accompanying drawings may also be obtained from these accompanying drawings without any creative effort.

DESCRIPTION OF EMBODIMENTS

In order to make the purposes, technical solutions and advantages of the embodiments of the present disclosure more clear, the technical solutions in the embodiments of the present disclosure will be described clearly and completely below in combination with the accompanying drawings in the embodiments of the present disclosure. Obviously, the described embodiments are part of the embodiments of the present disclosure, not all of them. Based on the embodiments in the present disclosure, all other embodiments obtained by an ordinary person skilled in the art without paying creative effort all belong to the protection scope of the present disclosure.

The following will first explain the names involved in the embodiments of the present disclosure.

A uniform resource locator, also known as a URL, is a representation method used to specify a location of information on the World Wide Web service program of the Internet. The uniform resource locator is a concise representation of the location and access method of resources that can be obtained from the Internet, and is an address of a standard resource on the Internet. A resource file on the Internet corresponds to a unique URL, which contains information indicating a location of the file and how a browser should do with it. A basic URL includes information such as a mode (or a protocol), a server name (or an IP address), a path, and a file name, for a complete URL, which further includes other information beyond these, which will not be exemplified here.

Figure 1:
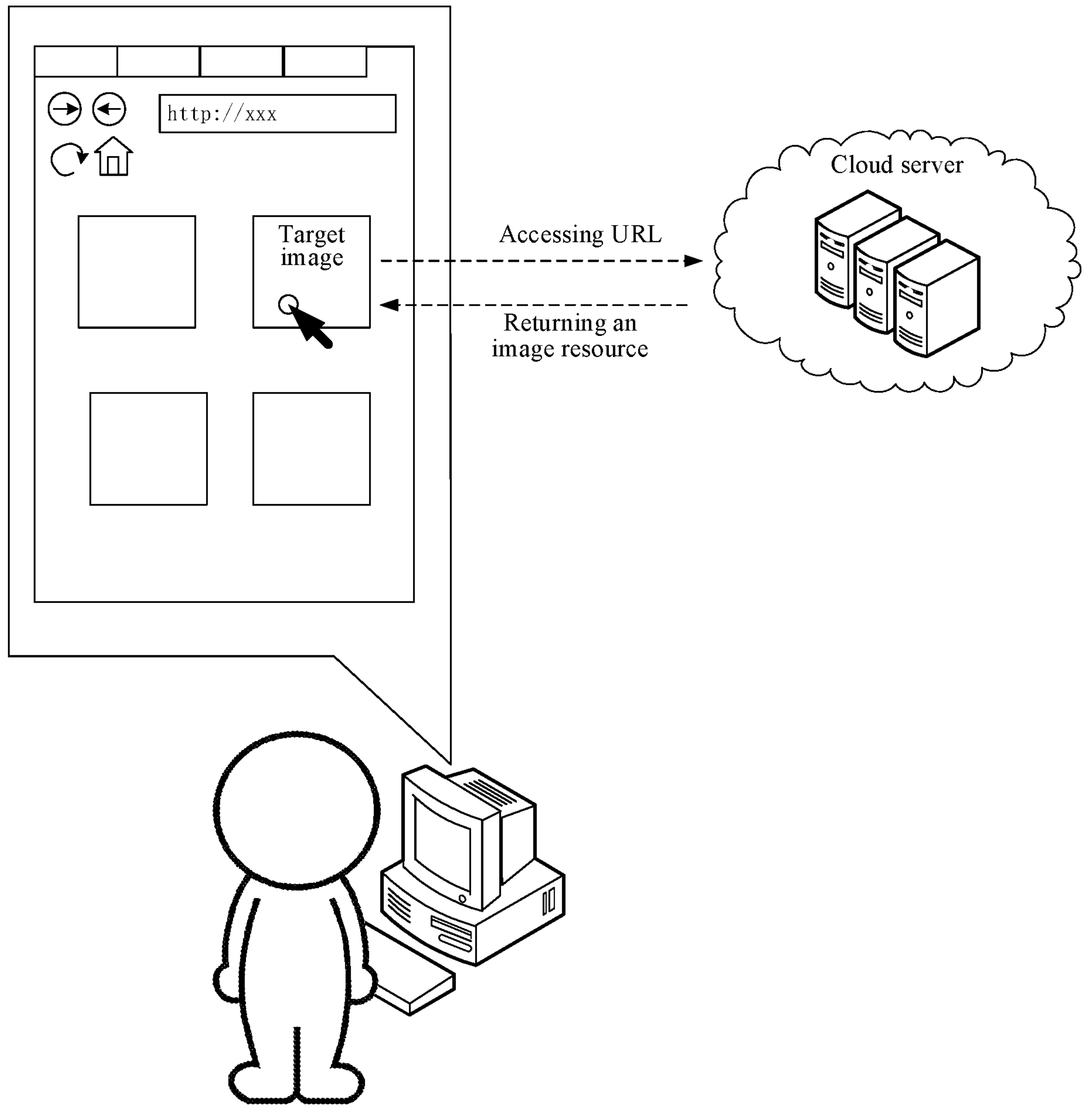
FIG. 1 is a schematic diagram of an application scenario provided by an embodiment of the present disclosure.

FIG. 1 is a schematic diagram of an application scenario provided by an embodiment of the present disclosure, referring to FIG. 1, an image resource on the network are generally stored in a cloud server, and the image resource corresponds to a unique URL. In an exemplary application scenario, a user browses a business website through a terminal device, when needing to view a target image, the user clicks on a link provided by the business website to access a URL corresponding to the target image, thereby locating and obtaining the target image stored in the cloud server, and achieving a viewing process of the target image.

For example, when configuring the image resource displayed on the business website, the business website developer in the above application scenario needs to process the image according to a specific display requirement, such as adjusting a size, a direction, or an access permission of the image. In a related technology, the cloud server manufacturer usually directly places detailed parameter information for processing the above image in a query (Query) parameter of the image URL. However, this method may lead to two problems: firstly, the detailed parameter information is directly exposed, the parameter is complex, and the meaning of a certain suffix is determined only by combining a document. If different image display areas in the business scenario need to keep the same processing parameters, the developer of the business website needs to manage this internal correlation on his own. Due to the complexity of the processing flow and the parameter, the management cost and learning cost of the developer of the business website will rise. Secondly, when concatenating the URL, random information such as user device information may be added to the Query parameter. If the processing parameter is placed in the Query parameter, a content delivery network (CDN) cannot use the URL containing all Query parameters as a cache key when caching image data, this is because such random information would greatly reduce a hit rate of the CDN. Therefore, when the CDN is performing caching, it is necessary to extract the image processing parameter and only add the relevant parameter to the cache key, which increases technical complexity. In addition, according to specific needs, the developer of the business web site may add some custom information into the Query parameter, which may interfere with the parsing of the image processing parameter by the server side. In summary, due to the complex and flexible requirement for the image processing, the generated image URL in the related technology contains a large number of non-standard suffixes, which makes the process of generating the image URL complex and inefficient, while rising substantially the management cost and usage cost of the generated image URL.

Embodiments of the present disclosure provide a method and an apparatus for generating an image processing interface, a device, and a storage medium to solve the above problems.

Figure 2:
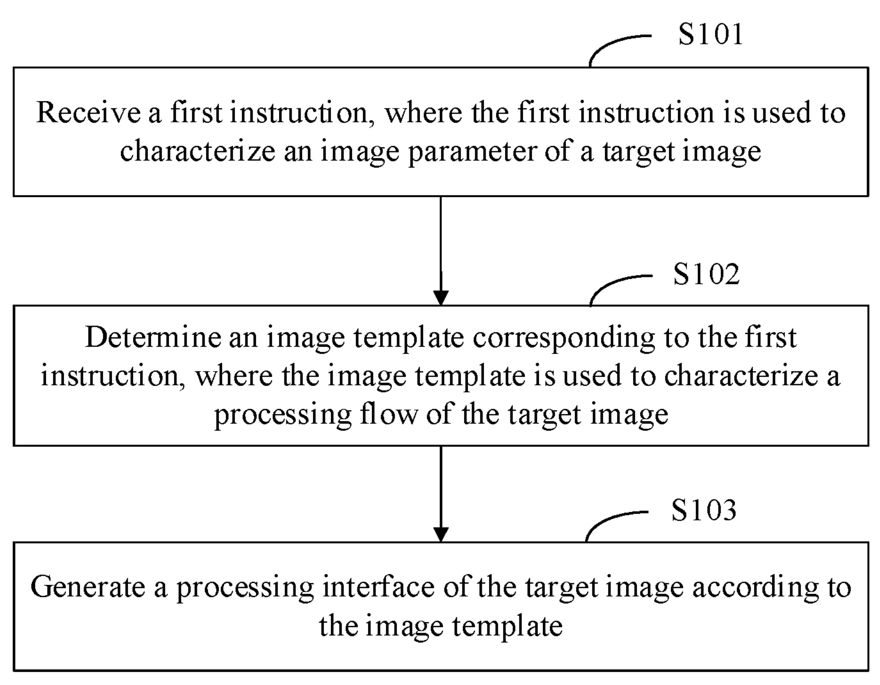
FIG. 2 is a first flow chart of a method for generating an image processing interface provided by an embodiment of the present disclosure.

Referring to FIG. 2, FIG. 2 is a first flow chart of a method for generating an image processing interface provided by an embodiment of the present disclosure. The method of this embodiment can be applied to a server, and the method for generating an image processing interface includes the following.

S101: receive a first instruction, where the first instruction is used to characterize an image parameter of a target image.

Exemplarily, the first instruction may be instruction information sent by the developer user to the server through the terminal device, the first instruction is used to set the image parameter of the target image. After receiving the first instruction, the server will process the target image according to the image parameter of the target image characterized by the first instruction, such as adjusting the format and size of the image, and then generate the URL of the target image, so that other terminal devices may access the processed target image according to the image parameter when accessing the URL, thereby achieving a purpose that the developer user configures the target image.

S102: determine an image template corresponding to the first instruction, where the image template is used to characterize a processing flow of the target image.

The image template is information used to describe the processing flow of the image, and different image templates correspond to different processing flows for the target image. For example, an image template A is used to set the size of the target image as the preset size, and an image template B is used to scale the target image equally first, and then apply Gaussian blur to the target image. Different processing flows for target images may be achieved through different image templates, thereby meeting the different image configuration needs of the developer user. In a possible implementation, the image parameter of the target image is obtained through the first instruction, the template name of the image template is determined according to the image parameter and a preset image template mapping relationship, and then the image template is determined. Therein, the image template mapping relationship is used to characterize a mapping relationship between the image template name and the image parameter.

Further, exemplarily, the image template is stored in a database, the image template is a JS object notation (JavaScript Object Notation, JSON) format file, and the image template includes multiple functional fields which are used to characterize the processing flow of the target image, an image encoding parameter (such as an encoding quality parameter), and other content. The following is a code implementation of the image template:

```
{
  "name": "tplv-xxx-yyy",
  "parameters": [
    "width",
    "height"
  ],
  "filters": [
    {
      "name": "resize",
      "param": {
        "height": "${height}",
        "width": "${width}"
      }
    },
    {
      "name": "blur",
      "param": {
        "sigma": 1
      }
    }
  ],
  "output": {
    "quality": 75
  }
}
```

Where, “name” is the template name, and “parameters” is the variable parameter list of the template. “Filters” represents the process of processing the image, including an equal scaling processing (“resize”), in the resize function field, the parameter (“param”) includes a height (“height”) and width (“height”) of the scaled image; and it also includes blur processing (“blur”), in the blur function field, the parameter (“param”) includes a blur type (“sigma”). “Quality” in the output (“output”) represents the coding quality parameter, which is only effective for image formats that support the coding quality parameter, such as Joint Photographic Experts Group (JPEG) and WEBP. The processing flow that scaling in an equal proportion first and then processing with Gaussian blur for the target image through the above image template can be achieved. Where, the first instruction contains the image processing parameter required in the above processing flow, and the first instruction is input or set by the user. According to the first instruction, a template that may achieve the purpose of image setting indicated by the first instruction, namely the image template, may be determined, and the image template is determined by the content that needs to be set by the first instruction.

S103: generate a processing interface of the target image according to the image template.

Figure 3:
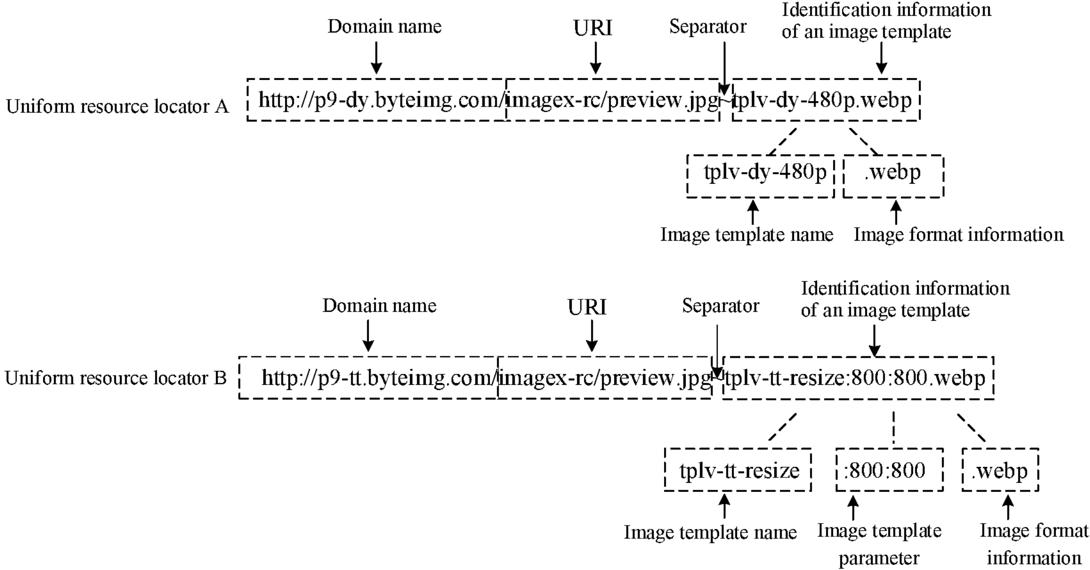
FIG. 3 is a schematic structural diagram of identification information of an image template provided by an embodiment of the present disclosure.

Specifically, the processing interface is a communication rule used to connect the target image and an external request when the target image is accessed by the external request. Exemplarily, the processing interface may be a uniform resource locator (URL). The uniform resource locator (URL) of the target image consists of a domain name, a uniform resource identifier (URI), and identification information of the image template, where the domain name and the uniform resource identifier are preset and can be set according to a specific need. The identification information of the image template includes an image template name, in an implementation, the identification information of the image template may also include: an image template parameter, where the image template parameter is used to characterize the processing parameter of the image template corresponding to the image template name when processing the target image; and/or image format information, where image format information is used to characterize an output image format after processing the target image. Exemplarily, the image format may be specified as common formats such as jpeg and png, and the output image format may also be kept the same as the original image. Since the image is divided into a static image (such as JPEG) and a dynamic image (such as Graphics Interchange Format, GIF), the conversion of the image format supports converting the static image to the static image, the dynamic image to the dynamic image, and the dynamic image to the static image. The conversion of the dynamic image to the static image is achieved by extracting one frame from the dynamic image, and there is generally little requirement for converting the static image to the dynamic image. Moreover, since the WEBP encoding standard may support both the static and dynamic images, defining the image format as WEBP means that the output image is a static image, and defining the image format as AWEBP means that the output image is adaptive, that is, when the original image is a static image, static WEBP is output, and when the original image is a dynamic image, dynamic WEBP is output. The uniform resource locator may be obtained by a combination according to the uniform resource identifier, the domain name, the identification information of the image template, and the preset separator. Where, for example, the separator may be “~”, that is, the unified resource identifier, the domain name, and the identification information of the image template are separated through “~”. In an implementation, the image template name may adopt a specification of a template identifier—<business abbreviation>-<business custom name>, where the business abbreviation is a fixed string related to the business, the business cannot be changed and can specify the part of the custom name, and the template name is globally unique. More specifically, FIG. 3 is a schematic structural diagram of identification information of an image template provided by an embodiment of the present disclosure, as illustrated in FIG. 3, in a uniform resource locator A, “P9-dy byteimg.com/” is the domain name, “imagex-rc/review.jpg” is the uniform resource identifier (URI) of the target image, “tplv-dy-480p” is the image template name, and “.webp” is the format of the returned image, that is, the image format information. The combination of the image template name and the image format information is the identification information of the image template. Different parts are separated by the separator “~”. In a uniform resource locator B, “p9-tt.byteimg.com” is the domain name, “imagex-rc/preview.jpg” is the uniform resource identifier (URI) of the target image, “tplv-tt-resize”

is the image template name, ":800:800" is the image template parameter, which defines width and height of the thumbnail, and ".webp" is the format of the returned image. The combination of the image template name, the image template parameter and the image format information is the identification information of the image template. Different parts are separated by the separator "~". Since the processing flow for processing the image is defined in the image template, after determining the image template and the related input parameter according to the first instruction, the corresponding uniform resource locator for the target image after image processing may be generated according to the identification information of the image template, the domain name, and the uniform resource identifier.

It should be noted that the embodiment is based on the implementation that the uniform resource locator is the image processing interface, and the method for generating an image processing interface provided by the embodiment of the present disclosure is described, but it is not limited to one method for generating the uniform resource locator. The method for generating an image processing interface provided by this embodiment may also be applied to other specifications that can use this method.

In the embodiment, a first instruction is received, where the first instruction is used to characterize an image parameter of a target image; an image template corresponding to the first instruction is determined, where the image template is used to characterize a processing flow of the target image; and a processing interface of the target image is generated according to the image template. Since the image template standardizes the process and steps of image processing, the specific operation steps for generating an image processing interface are simplified, while standardizing the generated image processing interface, reducing the using and maintenance cost of the image processing interface, and improving the security of the image processing interface.

Figure 4:
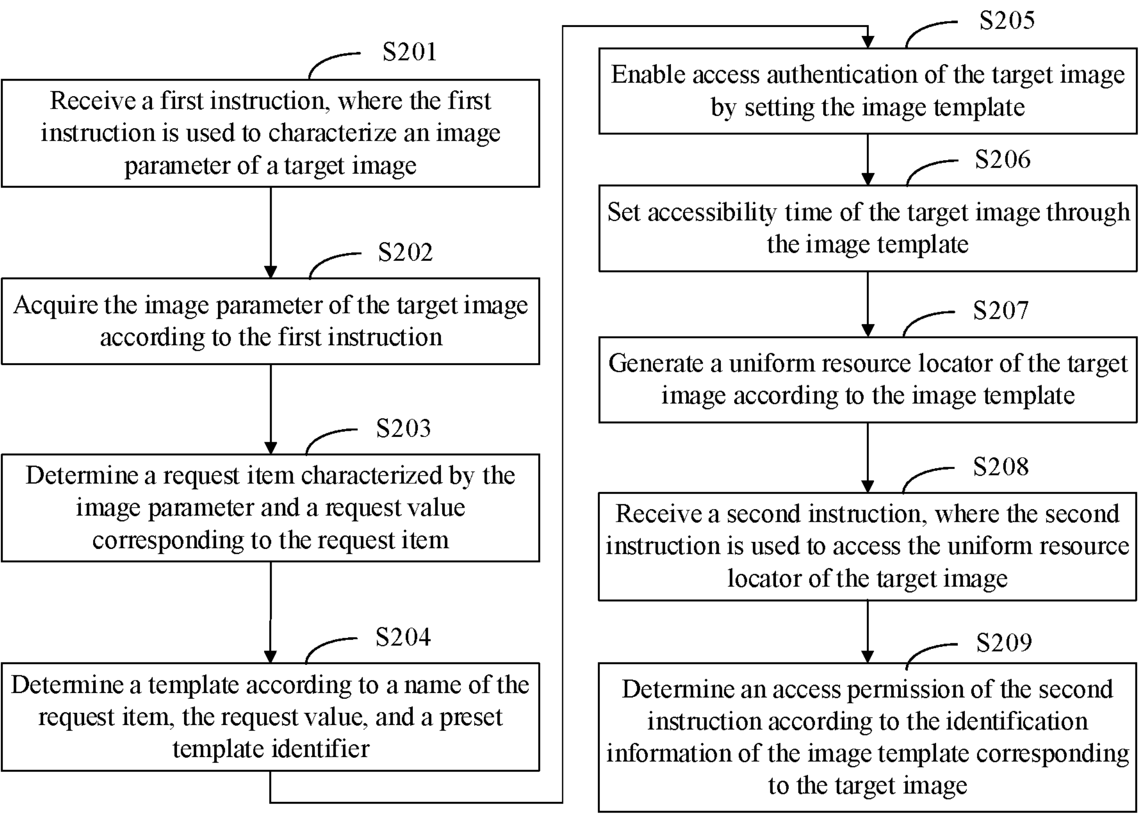
FIG. 4 is a second flow chart of a method for generating an image processing interface provided by an embodiment of the present disclosure.

Referring to FIG. 4, FIG. 4 is a second flow chart of a method for generating an image processing interface provided by an embodiment of the present disclosure. On the basis of the embodiment shown in FIG. 2, in this embodiment, in order to increase the access security of the generated uniform resource locator of the target image, an authentication step is added, and the step of accessing the uniform resource locator according to the second instruction is added. The method for generating an image processing interface includes the following.

S201: receive a first instruction, where the first instruction is used to characterize an image parameter of a target image.

S202: acquire the image parameter of the target image according to the first instruction.

S203: determine a request item characterized by the image parameter and a request value corresponding to the request item.

Figure 5:
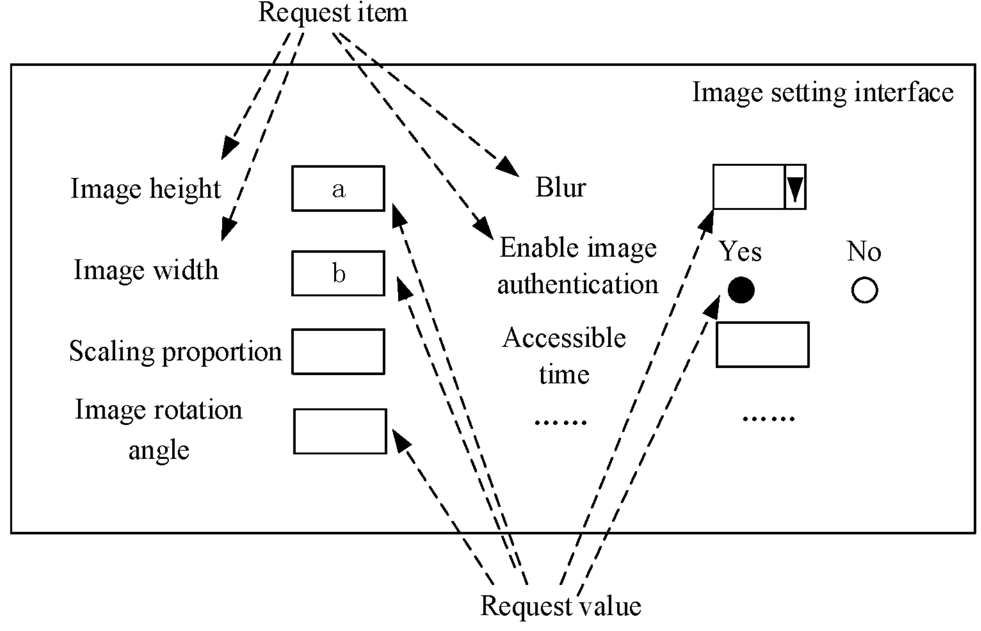
FIG. 5 is a schematic diagram of a UI interface provided by an embodiment of the present disclosure.

Exemplarily, the first instruction carries information that characterizes how to process the target image, such as modifying the size of the image, increasing the sharpness of the image, etc., the specific content of the image processing corresponding to such information is the request item, which corresponds to a specific request value. More specifically, the first instruction may be generated by the developer user through a user interface (UI) to set the specific request item. FIG. 5 is a schematic diagram of a UI interface provided by an embodiment of the present disclosure, as illustrated in FIG. 5, a variety of request items used to process the target image are set on the image setting interface, through the UI interface, the user sets the height of the image as a pixel and the width of the image as b pixel, and adds Gaussian blur to the target image. The first instruction generated accordingly contains the above information. Therefore, according to the content of the first instruction, it is possible to determine the image parameter of the corresponding target image, thereby determining the corresponding request item (such as the height of the image) and the request value (a pixel) corresponding to the request item.

S204: determine a template according to a name of the request item, the request value, and a preset template identifier.

Exemplarily, the specific content for processing the image is determined after determining the name of the request item and the corresponding request value. Furthermore, according to the specific content for processing the image, a template name of the matching image template is determined, and then the image template is determined.

S205: enable access authentication of the target image by setting the image template.

Exemplarily, the functional field of the image template includes an authentication field, and the authentication field is used to indicate whether an access authentication for the target image is enabled. Specifically, in the JSON file of the template, for example, the "withsig" field is used to indicate whether authentication is enabled, if it is true, which indicates the authentication is enabled, if it is false, which indicates the authentication is not enabled. The key required for the authentication is also stored in the JSON description file.

The following is a code implementation of the image template that enables authentication protection:

```
{
  "name": "tplv-19tz3ytenx-watermark",
  "withsig": true,
  "sigkey1": "123456",
  "parameters": [
    "wtext"
  ],
  "filters": [
    {
      "name": "watermark",
      "param": {
        "text": "${wtext}"
      }
    }
  ]
}
```

Where, the name of the template ("name") is "tplv-19tz3ytenx-watermark", which is used to add a text watermark to the image, the "withsig" field is used to control whether authentication protection is enabled; "sigkey1" is the authentication key; the content of the watermark text ("text") is passed in from the uniform resource locator and saved through the parameter ("parameters") "wtext".

In the embodiment of the present disclosure, the authentication function for a single target image may be enabled or disabled by setting the image template. However, in the related art, the authentication for the uniform resource locator may only be completed at the domain level, that is, for a certain CDN domain name, the authentication function may only be fully enabled or disabled. For the image access scenario, the authentication is not required in most cases, the authentication information needs to be added only in a scenario that preventing malicious tampering of the uniform resource locator. Through the image template, it is possible to achieve the on-demand authentication for the uniform resource locator, reduce unnecessary authentication and signature verification calculation, and avoid computational resource waste.

In an implementation, the following are further included.

S206: set accessibility time of the target image through the image template.

Specifically, the setting the accessibility time of the target image refers to controlling that the target image to be accessed only within the preset time period and expires after exceeding the time point, so as to achieve the anti-theft chain function of the uniform resource locator for the target image. Exemplarily, the setting the accessibility time of the target image through the image template includes: adding the field "req_deadline" in the JSON description file of the image template, which is not empty to indicate that expiration protection is enabled. Where, the field is set to pass a value from the uniform resource locator. When distributing the uniform resource locator of the image, the Unix timestamp of the expiration time of the uniform resource locator is placed in the image template parameter in the identification information of the image template, attaching the calculated authentication information. Similar to the above authentication scenario, after receiving a request to access the target image, the server first verifies whether the authentication information of the uniform resource locator of the target image is correct, and then verifies whether the current system time is within the validity period of the uniform resource locator, if the verification fails, the server directly refuses to process the request; and if the verification passes, the server processes the image request, calculates an expiration time interval of the uniform resource locator (such as 300 seconds), and sets the expiration time interval in the returned HTTP (HyperText Transfer Protocol) cache header. The format of the cache header is Cache-Control:max-age=<time interval>. The CDN domain name is configured accordingly to strictly follow the cache header.

The following is a code implementation of an image template set with expiration protection:

```
{
  "name": "tplv-19tz3ytenx-secure",
  "withsig": true,
  "sigkey1": "123456",
  "req_deadline": "${deadline}",
  "parameters": [
    "deadline"
  ]
```

Where, the image template name (name) is "tplv-19tz3ytenx-secure", including the function field "req_deadline", which is used to set the accessibility time of the target image, and the field "withsig" is used to control whether the authentication protection is enabled; "sigkey1" is the authentication key; and the expiration timestamp is stored in the variable "deadline" and passed from the image template parameter in the identification information of the image template of the uniform resource locator.

S207: generate a uniform resource locator of the target image according to the image template.

S208: receive a second instruction, where the second instruction is used to access the uniform resource locator of the target image.

S209: determine an access permission of the second instruction according to the identification information of the image template corresponding to the target image.

Exemplarily, the second instruction is a request of the user to access the target image, which is used to achieve accessing the target image through accessing the uniform resource locator of the target image. After receiving the second instruction, the access permission of the second instruction may be determined before responding to the second instruction to ensure the access security.

Where, the identification information of the image template contains authentication information used to determine the access permission of the second instruction, and the access permission of the second instruction may be confirmed by signing and verifying the uniform resource locator in the identification information of the image template.

Specifically, the flow of signing the uniform resource locator includes the following.

A HMAC-SHA1 algorithm is used and an authentication key is used as an parameter to generate a signature for the URL path section, then the signature is encoded by a Base64 URL Safe algorithm, and finally "?sig=encoded signature content" is attached to the identification information of the image template. For example, the unauthenticated uniform resource locator is "http://p3-tt.byteimg.com/imagex-rc/preview.jpg~Tplv-19tz3ytenx-watermark:5rWL6K-V5L-h5oGv.image", the function of the image template is to add a watermark text "test information" to the image, the identification information of the image template is "tplv-19tz3ytenx watermark:5rWL6K-V5L-h5oGv.image", where "5rWL6K-V5L-h5oGv" is a string of the watermark "test information" encoded by the Base64 URL Safe. The authentication key of the template is 123456, which serves as the key for HMAC-SHA1, and uses "URL Path/image-rc/preview.jpg~tplv-19tz3ytenx-watermark:5rWL6K-V5L-h5oGv.image?sig=0b27cqnNYROyyBR57XyPyI1J_lo=" as the input string of the HMAC-SHA1. Firstly, the above information is used for HMAC-SHA1 hashing. Then, Base64 URL Safe encoding is performed on the hashed result to obtain the authentication information "0b27cqnNYROyyBR57XyPyI1J_lo=". Finally, after attaching the authentication information to the identification information of the image template, the uniform resource locator after authentication is obtained as follows: "http://p3-tt.byteimg.com/imagex-rc/preview.jpg~tplv-19tz3ytenx-watermark:5rWL6K-V5L-h5oGv.image?sig=0b27cqnNYROyyBR57XyPyI1J_Lo=", where the identification information of the image template is "tplv-19tz3ytenx watermark: 5rWL6K-V5L-h5oGv.image?sig=0b27cqnNYROyyBR57XyPyI1J_lo=".

When the server generates and issues the unified resource locator of the images, it is necessary to sign the uniform resource locator, generate authentication information, and attach it to the Query parameter of the uniform resource locator. When the requesting client accesses the uniform resource locator with authentication, the CDN receives the request and needs to transmit the complete uniform resource locator to the source station when returning to the source, after receiving the uniform resource locator, the source station server generates the signature content in the same way and compares it with the signature content in the uniform resource locator, if they are same, the verification is passed, and the image may continue to be processed, if they are different, it is considered an illegal request, and the request is refused to be processed.

In one possible scenario, if a certain uniform resource locator has already been accessed using the correct authentication information and the CDN has cached the processing results of the uniform resource locator, then the subsequent access to the uniform resource locator may still be performed normally without providing authentication information.

In the embodiment of the present disclosure, by adding authentication information to the generated uniform resource locator and performing authentication when accessing the uniform resource locator, it is ensured that the corresponding uniform resource locator of the target image is not tampered with, the integrity of the uniform resource locator of the target image is ensured, and the access security is improved.

In an implementation, further, the identification information of the image template in the uniform resource locator also includes accessible time, the access permission for the second instruction is determined according to the accessible time.

Exemplarily, the uniform resource locator of the target image is "http://p3-tt.byteimg.com/imagex-rc/preview.jpg~tplv-19tz3ytenx-secure: 1703873958 Image?sig=33u-wWouSaVPrRHLRfiWrO2J1G8=", where "tplv-19tz3ytenx-secure: 1703873958.image?sig=33u-wWouSaVPrRHLRfiWrO2J1G8=" is the identification information of the image template, "1703873958" is a Unix timestamp, that is, the accessible time, which indicates that the uniform resource locator of the target image expires after this time point and is not accessible. Based on the comparison between the system time when accessing through the second instruction with the accessible time, it is determined that whether the system time when accessing through the second instruction exceeds the accessible time, so as to determine whether the second instruction has an access permission.

In this embodiment, the access permission of the second instruction is verified through the accessible time in the uniform resource locator, which prevents a hotlinking connection of the uniform resource locator, thereby improving the access security.

Figure 6:
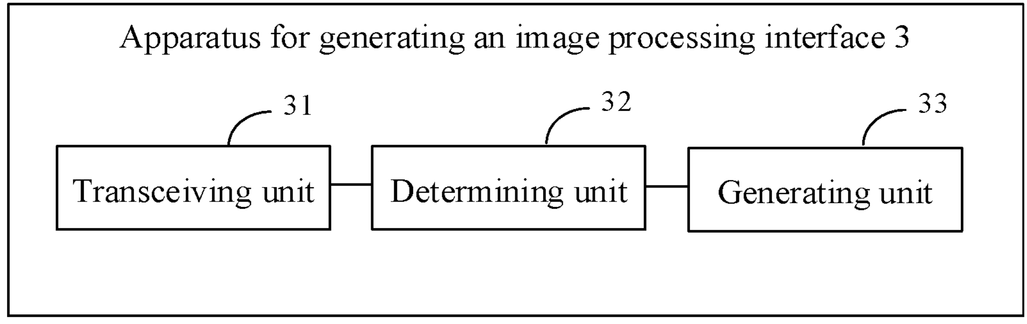
FIG. 6 is a block diagram of a structure of an apparatus for generating an image processing interface provided by an embodiment of the present disclosure.

Correspond to the method for generating an image processing interface of the above embodiments, FIG. 6 is a block diagram of a structure of an apparatus for generating an image processing interface provided by an embodiment of the present disclosure. For the ease of explanation, only parts related to the embodiments of the present disclosure are shown. Referring to FIG. 6, the apparatus for generating an image processing interface 3 includes:

a transceiving unit 31, configured to receive a first instruction, where the first instruction is used to characterize an image parameter of a target image;

a determining unit 32, configured to determine an image template corresponding to the first instruction, where the image template is used to characterize a processing flow of the target image; and a generating unit 33, configured to generate a uniform resource locator of the target image according to the image template.

In one embodiment of the present disclosure, the processing interface is the uniform resource locator, the uniform resource locator of the target image comprises identification information of the image template, a domain name corresponding to the target image, a uniform resource identifier corresponding to the target image, and a preset separator, where the identification information of the image template comprises an image template name and an image template parameter, and the image template parameter is used to characterize a processing parameter of the image template corresponding to the image template name when processing the target image.

In one embodiment of the present disclosure, the identification information of the image template further includes format information of the target image.

In one embodiment of the present disclosure, the determining unit 32 is specifically configured to: acquire a processing parameter of the target image according to the first instruction; determine a request item characterized by the processing parameter and a request value corresponding to the request item; and determine an image template according to a name of the request item, the request value, and a preset template identifier.

In one embodiment of the present disclosure, the image template is a JSON format file, the image template includes a plurality of functional fields, and the functional field is used to characterize a processing step for the target image.

In one embodiment of the present disclosure, the functional field of the image template includes an authentication field, and the authentication field is used to indicate whether an access authentication for the target image is enabled.

In one embodiment of the present disclosure, the functional field of the image template includes an access time field, and the access time field is used to characterize accessible time of the target image.

In one embodiment of the present disclosure, the transceiving unit 31 is further configured to: receive a second instruction, where the second instruction is used to access the uniform resource locator of the target image; and send the target image according to the second instruction.

In one embodiment of the present disclosure, before sending the target image, the determining unit 32 is further configured to:

acquire identification information of the image template in the uniform resource locator of the target image; and determine an access permission of the second instruction according to the identification information of the image template.

In one embodiment of the present disclosure, the identification information of the image template includes authentication information, and the authentication information is used to verify the access permission of the second instruction.

In one embodiment of the present disclosure, the identification information of the image template further includes accessible time, the accessible time is used to determine whether the uniform resource locator of the target image is accessible by the second instruction at the current time.

The device provided in the embodiment may be used to execute the technical solution of the above method embodiment, and the implementation principles and technical effects there between are similar, which will not be repeated in this embodiment.

Figure 7:
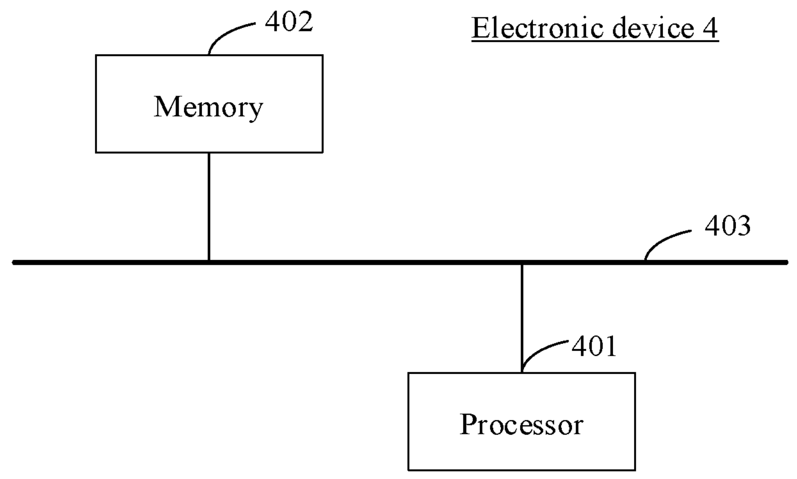
FIG. 7 is a schematic structural diagram of an electronic device provided by an embodiment of the present disclosure.

FIG. 7 is a schematic structural diagram of an electronic device provided by an embodiment of the present disclosure, as illustrated in FIG. 7, the electronic device 4 includes at least one processor 401 and a memory 402;

where the memory 402 has a computer-executable instruction stored therein; and the at least one processor 401 executes the computer-executable instruction stored in the memory 402 to enable the at least one processor 401 to perform the method for generating an image processing interface in the embodiments illustrated in FIG. 2-FIG. 5.

Where the processor 401 and the memory 402 are connected through a bus 403.

The relevant explanation may be understood by referring to the related descriptions and effects corresponding to the steps in the embodiments corresponding to FIG. 2 to FIG. 5, which will not be elaborated too much here.

Figure 8:
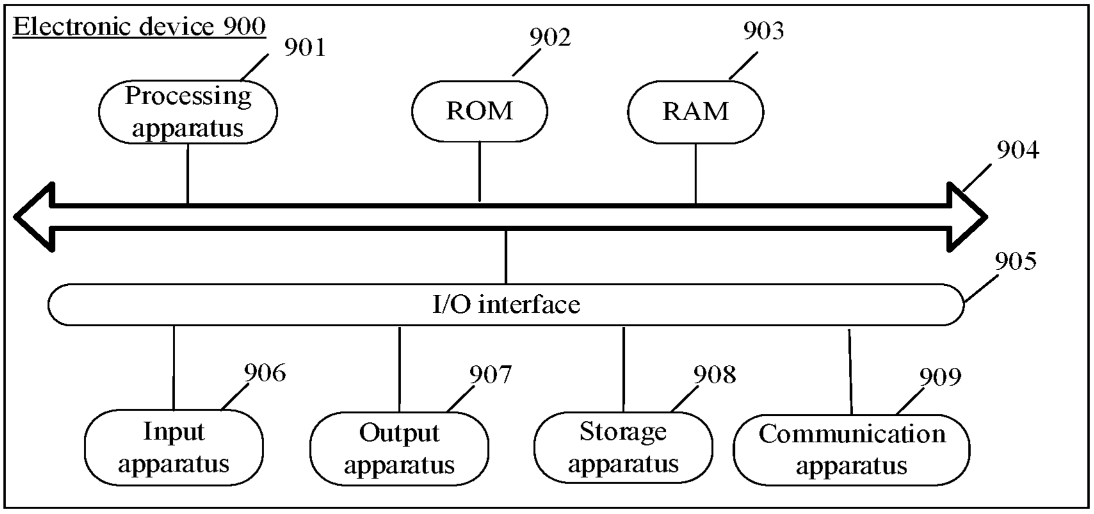
FIG. 8 is a schematic structural diagram of hardware of an electronic device provided by an embodiment of the present disclosure.

Referring to FIG. 8, which illustrates a schematic structural diagram of an electronic device 900 suitable for implementing an embodiment of the present disclosure, where the electronic device 900 may be a terminal device or a server. The terminal device may include but are not limited to mobile terminals such as a mobile phone, a laptop, a digital broadcast receiver, a personal digital assistant (PDA), a portable android device (PAD), a portable media player (PMP), a vehicle terminal (such as a vehicle navigation terminal), etc., and fixed terminals such as a digital TV (Television), a desktop computer, etc. The electronic device shown in FIG. 8 is only an example, and there should be no limitations on the function and the scope of use of the embodiments of the present disclosure.

As shown in FIG. 8, the electronic device 900 may include a processing apparatus (such as a central processing unit, a graphics processing unit, etc.) 901, where the processing apparatus may perform various appropriate actions and processing according to a program stored in a read only memory (ROM) 902 or a program loaded into a random access memory (RAM) 903 from a storage apparatus 908. Various programs and data required for the operation of the electronic device 900 may also be stored in the RAM 903. The processing apparatus 901, the ROM 902, and the RAM 903 are connected to each other through a bus 904. An input/output (I/O) interface 905 is also connected to the bus 904.

In general, the following apparatus may be connected to the I/O interface 905: an input apparatus 906, such as a touchscreen, a touchpad, a keyboard, a mouse, a camera, a microphone, an accelerometer, a gyrometer, etc.; an output apparatus 907, such as a liquid crystal display (LCD), a speaker, a shaker, etc.; a storage apparatus 908, such as a magnetic disk, a hard disk, etc.; and a communication apparatus 909. The communication apparatus 909 allows the electronic device 900 to exchange data with other devices through a wireless or wire communication. Although FIG. 8 shows the electronic device 900 with various apparatuses, it should be understood that it is not required to implement or provide all the apparatus shown. More or fewer apparatuses may alternatively be implemented or provided.

In particular, according to the embodiment of the present disclosure, the process described above with reference to the flowchart may be implemented as a computer software program. For example, an embodiment of the present disclosure includes a computer program product, which includes a computer program loaded on a computer readable medium, and the computer program includes a program code for executing the method shown in a flowchart. In such an embodiment, the computer program may be downloaded and installed from the network through the communication apparatus 909, or installed from the storage apparatus 908, or installed from the ROM 902. When the computer program is executed by the processing apparatus 901, the above functions defined in the method of the embodiment of the present disclosure are executed.

It should be noted that the computer readable medium described in the present disclosure may be a computer readable signal medium, a computer readable storage medium, or a combination of the above two. The computer readable storage medium may be, for example, but not limited to, an electrical, magnetic, optical, electromagnetic, infrared, or semiconductor system, apparatus, or device, or any combination the foregoing. More specific examples of the computer readable storage medium may include, but are not limited to: an electrical connection with one or more wires, a portable computer disk, a hard disk, a random access memory (RAM), a read only memory (ROM), an erasable programmable read-only memory (EPROM or flash memory), a fiber optic, a portable compact disk read-only memory (CD-ROM), an optical storage device, a magnetic storage device, or any suitable combination of the foregoing. In the present disclosure, a computer readable storage medium may be any tangible medium containing or storing a program, which may be used by or in combination with an instruction execution system, apparatus, or device. And in the present disclosure, the computer readable signal medium may include data signals transmitted in the baseband or as part of the carrier, in which a computer readable program code is carried. Such transmitted data signals may take various forms, including but not limited to electromagnetic signals, optical signals or any suitable combination of the above. The computer readable signal medium may also be any computer readable medium other than the computer readable storage medium, which may send, propagate, or transmit programs for use by or in combination with an instruction execution system, apparatus, or device. The program code contained on the computer readable medium may be transmitted using any suitable medium, including, but not limited to, an electrical wire, an optical fiber cable, RF (Radio Frequency), etc., or any suitable combination of the foregoing.

The above computer readable medium may be embodied in the above electronic device; and may also exist alone without being assembled into the electronic device.

The above computer readable medium carries one or more programs which, when executed by the electronic device, enables the electronic device to execute the method illustrated in the above embodiments.

The computer program code for executing operations in the present disclosure may be written in one or more programming languages or the combination thereof, including object-oriented programming languages—such as Java, Smalltalk, C++, and conventional procedural programming languages—such as the "C" language or similar programming languages. The program code may execute entirely on the user's computer, partly on the user's computer, as a stand-alone software package, partly on the user's computer and partly on a remote computer, or entirely on the remote computer or a server. In the scenario involving the remote computer, the remote computer may be connected to the user's computer through any type of network, including a local area network (LAN) or a wide area network (WAN), or the connection may be made to an external computer (for example, through the Internet using an Internet Service Provider).

The flowcharts and block diagrams in the accompanying drawings illustrate architecture, functionality, and operations of possible implementations of the systems, the methods, and the computer program products according to various embodiments of the present disclosure. In this regard, each block in the flowcharts or block diagrams may represent a module, a program segment, or a portion of a code, which includes one or more executable instructions for implementing the specified logical functions. It should also be noted that, in some alternative implementations, the functions noted in the blocks may occur out of the order noted in the drawing. For example, two blocks shown in a succession may, in fact, be executed substantially in parallel, or the blocks may also sometimes be executed in a reverse order, depending on the functions involved. It is also noted that each block in the block diagrams and/or flowcharts, and a combination of the blocks thereof may be implemented by a dedicated hardware-based system for performing specified functions or operations, or by a combination of dedicated hardware and computer instructions.

The involved units described in the embodiments of the present disclosure may be implemented in a software manner, and may also be implemented in a hardware manner. The name of the unit does not constitute a limitation of the unit itself in some cases, for example, a first obtaining unit may also be described as "obtaining a unit of at least two Internet Protocol addresses".

The functions described above in the present disclosure may be executed, at least in part, by one or more hardware logic components. For example, unrestrictedly, exemplary types of hardware logic components that may be used include: a field-programmable gate array (FPGA), an application specific integrated circuit (ASIC), an application specific standard product (ASSP), a system-on-chip (SOC), a complex programmable logic device (CPLD) and so on.

In the context of the present disclosure, a machine readable medium may be a tangible medium that may contain or store a program for use by or in combination with an instruction execution system, apparatus, or device. The machine readable medium may be a machine readable signal medium or a machine readable storage medium. The machine readable storage media may include, but is not limited to an electrical, magnetic, optical, electromagnetic, infrared, or semiconductor system, apparatus, or device, or any suitable combination of the foregoing. More specific examples of the machine readable storage medium may include an electrical connection with one or more wires, a portable computer disk, a hard disk, a random access memory (RAM), a read only memory (ROM), an erasable programmable read only memory (EPROM or a flash memory), a fiber optic, a portable compact disk read-only memory (CD-ROM), an optical storage device, a magnetic storage device, or any suitable combination of the foregoing.

In a first aspect, a method for generating an image processing interface is provided according to one or more embodiments of the present disclosure, including: receiving a first instruction, where the first instruction is used to characterize an image parameter of a target image; determining an image template corresponding to the first instruction, where the image template is used to characterize a processing flow of the target image; and generating a processing interface of the target image according to the image template.

According to one or more embodiments of the present disclosure, the processing interface is a uniform resource locator, the uniform resource locator of the target image includes identification information of the image template, a domain name corresponding to the target image, a uniform resource identifier corresponding to the target image, and a preset separator, where the identification information of the image template includes an image template name and an image template parameter, and the image template parameter is used to characterize a processing parameter of the image template corresponding to the image template name when processing the target image.

According to one or more embodiments of the present disclosure, the identification information of the image template further includes format information of the target image.

According to one or more embodiments of the present disclosure, the determining the image template corresponding to the first instruction includes: acquiring a processing parameter of the target image according to the first instruction; determining a request item characterized by the processing parameter and a request value corresponding to the request item; and determining an image template according to a name of the request item, the request value, and a preset template identifier.

According to one or more embodiments of the present disclosure, the image template is a JSON format file, the image template includes a plurality of functional fields, and the functional field is used to characterize a processing step for the target image.

According to one or more embodiments of the present disclosure, the functional field of the image template includes an authentication field, and the authentication field is used to indicate whether an access authentication for the target image is enabled.

According to one or more embodiments of the present disclosure, the functional field of the image template includes an access time field, and the access time field is used to characterize an accessible time of the target image.

According to one or more embodiments of the present disclosure, the method further includes: receiving a second instruction, where the second instruction is used to access the uniform resource locator of the target image; and sending the target image according to the second instruction.

According to one or more embodiments of the present disclosure, before sending the target image, the method further includes: acquiring identification information of the image template in the uniform resource locator of the target image; and determining an access permission of the second instruction according to the identification information of the image template.

According to one or more embodiments of the present disclosure, the identification information of the image template includes authentication information, and the authentication information is used to verify the access permission of the second instruction.

According to one or more embodiments of the present disclosure, the identification information of the image template further includes accessible time, and the accessible time is used to determine whether the uniform resource locator of the target image is accessible by the second instruction at the current time.

In a second aspect, an apparatus for generating an image processing interface is provided according to one or more embodiments of the present disclosure, including:

a transceiving unit, configured to receive a first instruction, where the first instruction is used to characterize an image parameter of a target image;

a determining unit, configured to determine an image template corresponding to the first instruction, where the image template is used to characterize a processing flow of the target image; and a generating unit, configured to generate a uniform resource locator of the target image according to the image template.

According to one or more embodiments of the present disclosure, the processing interface is the uniform resource locator, the uniform resource locator of the target image includes identification information of the image template, a domain name corresponding to the target image, a uniform resource identifier corresponding to the target image, and a preset separator, where the identification information of the image template includes an image template name and an image template parameter, and the image template parameter is used to characterize a processing parameter of the image template corresponding to the image template name when processing the target image.

According to one or more embodiments of the present disclosure, the identification information of the image template further includes format information of the target image.

According to one or more embodiments of the present disclosure, the determining unit is specifically configured to: acquire a processing parameter of the target image according to the first instruction; determine a request item characterized by the processing parameter and a request value corresponding to the request item; and determine an image template according to a name of the request item, the request value, and a preset template identifier.

According to one or more embodiments of the present disclosure, the image template is a JSON format file, the image template includes a plurality of functional fields, and the functional field is used to characterize a processing step for the target image.

According to one or more embodiments of the present disclosure, the functional field of the image template includes an authentication field, and the authentication field is used to indicate whether an access authentication for the target image is enabled.

According to one or more embodiments of the present disclosure, the functional field of the image template includes an access time field, and the access time field is used to characterize an accessible time of the target image.

According to one or more embodiments of the present disclosure, the transceiving unit is further configured to: receive a second instruction, where the second instruction is used to access the uniform resource locator of the target image; and send the target image according to the second instruction.

According to one or more embodiments of the present disclosure, before sending the target image, the determining unit is further configured to: acquire identification information of the image template in the uniform resource locator of the target image; and determine an access permission of the second instruction according to the identification information of the image template.

According to one or more embodiments of the present disclosure, the identification information of the image template includes authentication information, and the authentication information is used to verify the access permission of the second instruction.

According to one or more embodiments of the present disclosure, the identification information of the image template further includes accessible time, and the accessible time is used to determine whether the uniform resource locator of the target image is accessible by the second instruction at the current time.

In a third aspect, an electronic device is provided according to one or more embodiments of the present disclosure, including: at least one processor and a memory;

the memory has a computer-executable instruction stored therein; and the at least one processor executes the computer-executable instruction stored in the memory to enable the at least one processor to perform the method for generating an image processing interface described in the first aspect above and various possible designs of the first aspect.

In a fourth aspect, a computer readable storage medium is provided according to one or more embodiments of the present disclosure, where the computer readable storage medium stores a computer-executable instruction, when the computer-executable instruction is executed by a processor, the method for generating an image processing interface described in the first aspect above and various possible designs of the first aspect is implemented.

In a fifth aspect, a computer program product is provided according to one or more embodiments of the present disclosure, which includes a computer program, when the computer program is executed by a processor, the method for generating an image processing interface described in the first aspect above and various possible designs of the first aspect is implemented.

In a sixth aspect, a computer program is provided according to one or more embodiments of the present disclosure, when the computer program is executed by a processor, the method for generating an image processing interface described in the first aspect above and various possible designs of the first aspect is implemented.

The above description is merely better embodiments of the present disclosure and explanation of the technical principles employed. Those skilled in the art should understand that the scope of disclosure involved in the present disclosure is not limited to the technical solutions formed by the specific combination of the above technical features, and should also cover, without departing from the above disclosed concept, other technical solutions formed by any combination of the above technical features or their equivalent features. For example, a technical solution formed by replacing the above features with technical features (but not limited to) that have similar functions to those disclosed in the present disclosure.

Additionally, although each operation is depicted in a particular order, which should not be understood as requiring that the operations should be performed in the particular order shown or in a sequential order. Multitask and parallel processing may be advantageous under certain circumstances. Likewise, although the above discussion contains several specific implementation details, those should not be construed as limitations on the scope of the present disclosure. Certain features described in the context of separate embodiments may also be implemented in combination in a single embodiment. Conversely, various features described in the context of a single embodiment may also be implemented in multiple embodiments separately or in any suitable sub-combination.

Although the subject matter has been described in languages specific to structural features and/or method logic actions, it should be understood that the subject matter defined in the appended claims is not necessarily limited to the specific features or actions described above. Rather, the specific features and actions described above are merely example forms for implementing the claims.

What is claimed is:

1. A method for generating an image processing interface, comprising:

receiving a first instruction, wherein the first instruction is used to characterize an image parameter of a target image;

determining an image template corresponding to the first instruction, wherein the image template is used to characterize a processing flow of the target image; and generating a processing interface of the target image according to the image template;

wherein the processing interface is a uniform resource locator;

wherein the uniform resource locator of the target image comprises identification information of the image template, a domain name corresponding to the target image, a uniform resource identifier corresponding to the target image, and a preset separator;

wherein the identification information of the image template comprises an image template name and an image template parameter; and wherein the image template parameter is used to characterize a processing parameter of the image template corresponding to the image template name when processing the target image.

2. The method according to claim 1, wherein the identification information of the image template further comprises format information of the target image.

3. The method according to claim 1, wherein the determining the image template corresponding to the first instruction comprises:

acquiring a processing parameter of the target image according to the first instruction;

determining a request item characterized by the processing parameter and a request value corresponding to the request item; and determining an image template according to a name of the request item, the request value, and a preset template identifier.

4. The method according to claim 1, wherein the image template is a JSON format file, the image template comprises a plurality of functional fields, and the functional field is used to characterize a processing step for the target image.

5. The method according to claim 4, wherein the functional field of the image template comprises an authentication field, and the authentication field is used to indicate whether an access authentication for the target image is enabled.

6. The method according to claim 5, wherein the functional field of the image template comprises an access time field, and the access time field is used to characterize accessible time of the target image.

7. The method according to claim 1, wherein the method further comprises:

receiving a second instruction, wherein the second instruction is used to access the uniform resource locator of the target image; and sending the target image according to the second instruction.

8. The method according to claim 7, before sending the target image, further comprising:

acquiring the identification information of the image template in the uniform resource locator of the target image; and determining an access permission of the second instruction according to the identification information of the image template.

9. The method according to claim 8, wherein the identification information of the image template comprises authentication information, and the authentication information is used to verify the access permission of the second instruction.

10. The method according to claim 9, wherein the identification information of the image template further comprises accessible time, the accessible time is used to determine whether the uniform resource locator of the target image is accessible by the second instruction at the current time.

11. An apparatus for generating an image processing interface, comprising at least one processor, a memory, and a communication interface connected with the at least one processor;

wherein the memory stores a computer-executable instruction;

wherein the at least one processor executes the computer-executable instruction stored in the memory to enable the at least one processor to:

receive, through the communication interface, a first instruction, wherein the first instruction is used to characterize an image parameter of a target image;

determine an image template corresponding to the first instruction, wherein the image template is used to characterize a processing flow of the target image; and generate a processing interface of the target image according to the image template;

wherein the processing interface is a uniform resource locator;

wherein the uniform resource locator of the target image comprises identification information of the image template, a domain name corresponding to the target image, a uniform resource identifier corresponding to the target image, and a preset separator;

wherein the identification information of the image template comprises an image template name and an image template parameter; and wherein the image template parameter is used to characterize a processing parameter of the image template corresponding to the image template name when processing the target image.

12. The apparatus according to claim 11, wherein the identification information of the image template further comprises format information of the target image.

13. The apparatus according to claim 11, wherein the processor is further configured to:

acquire a processing parameter of the target image according to the first instruction;

determine a request item characterized by the processing parameter and a request value corresponding to the request item; and determine an image template according to a name of the request item, the request value, and a preset template identifier.

14. The apparatus according to claim 11, wherein the image template is a JSON format file, the image template comprises a plurality of functional fields, and the functional field is used to characterize a processing step for the target image;

wherein the functional field of the image template comprises an authentication field, and the authentication field is used to indicate whether an access authentication for the target image is enabled; and wherein the functional field of the image template comprises an access time field, and the access time field is used to characterize accessible time of the target image.

15. The apparatus according to claim 11, wherein the processor is further configured to:

receive, through the communication interface, a second instruction, wherein the second instruction is used to access the uniform resource locator of the target image; and send, through the communication interface, the target image according to the second instruction.

16. The apparatus according to claim 15, before sending, through the communication interface, the target image, the processor is further configured to:

acquire the identification information of the image template in the uniform resource locator of the target image; and determine an access permission of the second instruction according to the identification information of the image template.

17. The apparatus according to claim 16, wherein the identification information of the image template comprises authentication information, and the authentication information is used to verify the access permission of the second instruction;

wherein the identification information of the image template further comprises accessible time, the accessible time is used to determine whether the uniform resource locator of the target image is accessible by the second instruction at the current time.

18. A non-transitory computer readable storage medium storing a computer-executable instruction, wherein when the computer-executable instruction is executed by a processor, the following steps are implemented:

receiving a first instruction, wherein the first instruction is used to characterize an image parameter of a target image;

determining an image template corresponding to the first instruction, wherein the image template is used to characterize a processing flow of the target image; and generating a processing interface of the target image according to the image template;

wherein the processing interface is a uniform resource locator;

wherein the uniform resource locator of the target image comprises identification information of the image template, a domain name corresponding to the target image, a uniform resource identifier corresponding to the target image, and a preset separator;

wherein the identification information of the image template comprises an image template name and an image template parameter; and wherein the image template parameter is used to characterize a processing parameter of the image template corresponding to the image template name when processing the target image.

19. The non-transitory computer readable storage medium according to claim 18, wherein the identification information of the image template further comprises format information of the target image.

20. The non-transitory computer readable storage medium according to claim 18, wherein when the computer-executable instruction is executed by the processor, the following steps are implemented:

acquiring a processing parameter of the target image according to the first instruction;

determining a request item characterized by the processing parameter and a request value corresponding to the request item; and determining an image template according to a name of the request item, the request value, and a preset template identifier.

* * * * *